Sept. 12, 1967  H. W. BRODIE  3,340,730
INSTRUMENT FOR MEASURING SOLAR RADIATION
Filed Nov. 16, 1964  3 Sheets-Sheet 1

INVENTOR.
HUGH W. BRODIE
BY Lyon & Lyon
ATTORNEYS

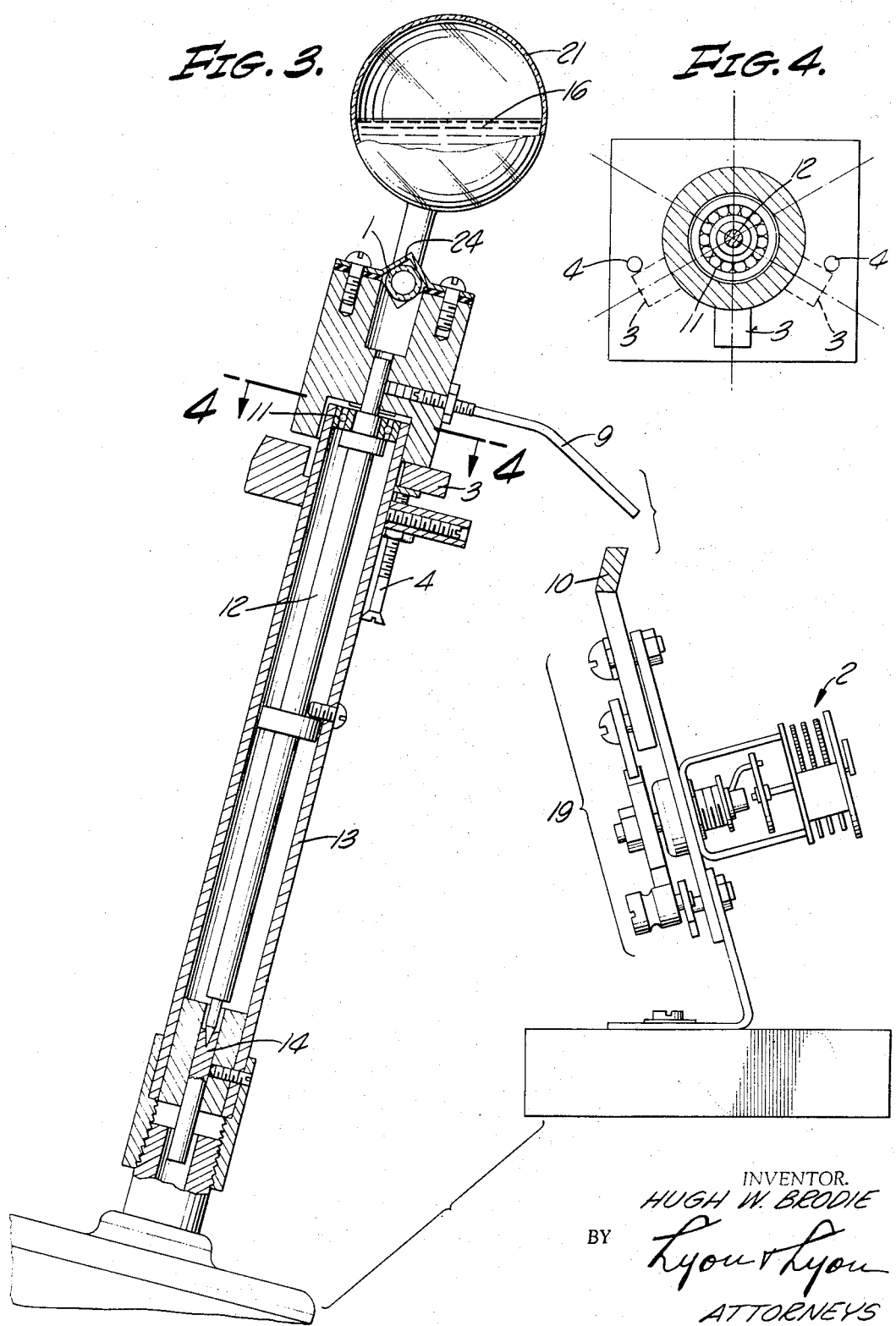

United States Patent Office 3,340,730
Patented Sept. 12, 1967

3,340,730
INSTRUMENT FOR MEASURING SOLAR RADIATION
Hugh W. Brodie, Honolulu, Hawaii, assignor to Hawaiian Development Company, Ltd., Honolulu, Hawaii, a corporation of Hawaii
Filed Nov. 16, 1964, Ser. No. 411,428
1 Claim. (Cl. 73—170)

ABSTRACT OF THE DISCLOSURE

A radiometer having a movable portion consisting of two glass bulbs connected by a tube, and containing a liquid. The movable portion has two stable positions, each of which has one of the glass bulbs exposed to the radiation being measured. A magnetic damping device is provided to maintain the movable portion in one of the stable positions until there is sufficient force to move it to the other stable position.

This invention relates to improvements in radiometers, especially those intended to record radiation from the sun.

The energy required to sustain life on earth is derived from the sun. A knowledge of the amount of solar energy received at the surface of the earth, therefore, is important in many fields of endeavor. The ability to utilize the knowledge is of particular importance to agriculture.

In many agricultural areas, measurements are made of air temperature, rainfall, wind velocity and humidity. Continuous measurements of solar radiation are seldom made. This is due to the difficulties involved in making these measurements. The two major difficulties are: (a) the high cost involved, or (b) the cost of each suitable instrument.

A principal object of this invention is to provide a low cost instrument with a low installation cost.

Another principal object is to provide an accurate and stable instrument which will provide information of solar radiation within statistically acceptable limits.

Another object is to provide an instrument which is suitable for field use. This suitability implies relative simplicity of operation; ruggedness; need for no more than weekly attention; and independence of power sources such as power lines.

Another object is the provision of an instrument that can be maintained and operated by relatively non-technical personnel.

A further object is the provision of measurements in a form easily obtained and readily convertible into the desired units.

These and other objects and advantages of the invention will become apparent from the following detailed description, taken with the accompanying drawings, wherein:

FIGURE 3 is a cutaway side view of the instrument showing its internal mechanism and is taken along lines 3—3 of FIGURE 2.

FIGURE 4 shows the bearings of the instrument and is taken along lines 4—4 of FIGURE 3.

Figure 2:
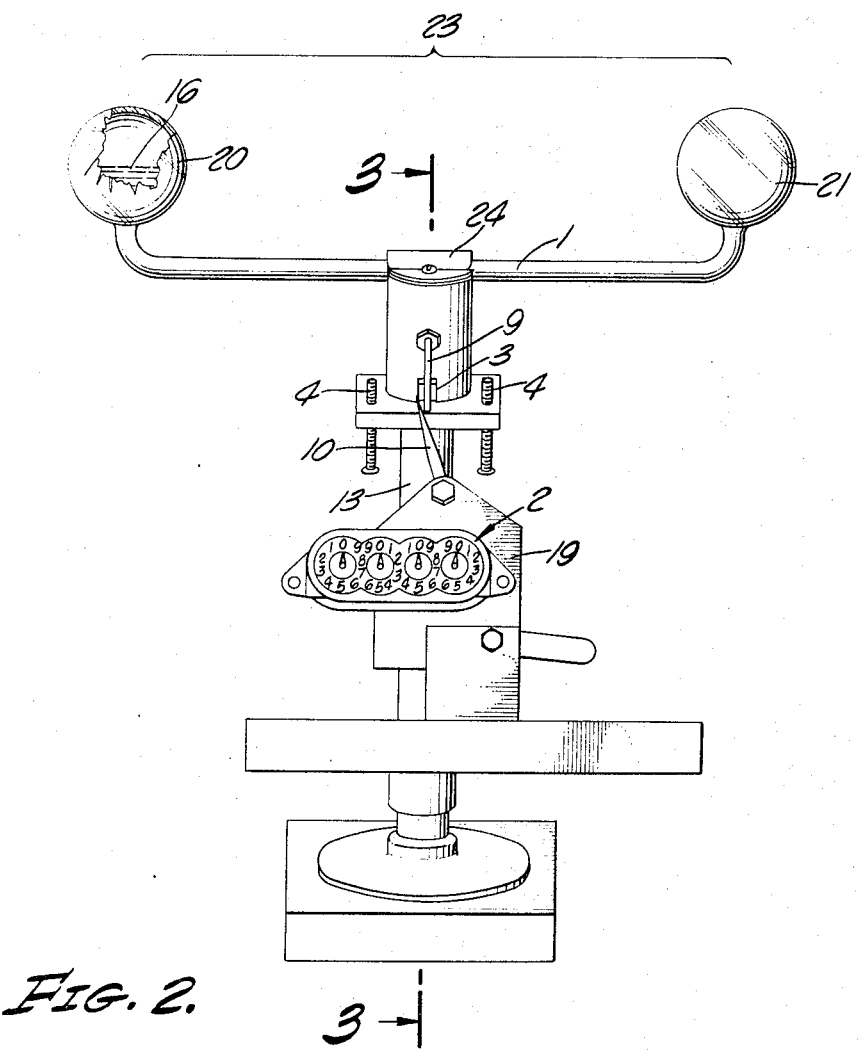
FIGURE 2 is a frontal view of the instrument with its housing removed.

In the preferred embodiment of the invention as shown by FIGURE 2, the pulse glass 23 is made up of two spherical glass bulbs 20 and 21, connected by a straight glass tube 1. The tube is bent near each end, forming right angles in the same plane. The air is removed from the pulse glass by vacuum and the bulbs are partially filled with a volatile liquid such an anhydrous methyl alcohol. The unit now containing substantially only alcohol in liquid and vapor phases is then sealed. The liquid 16 may be made to move from one bulb to the other by increasing the temperature of one of the bulbs. This flow is caused by an increase in vapor pressure. Provided there is a temperature difference between the bulbs, there will always be a flow from the warmer to the cooler bulb.

Figure 5:
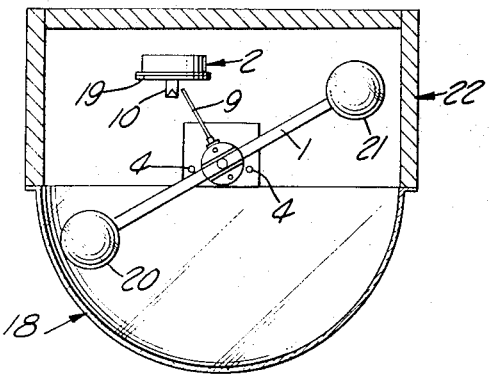
FIGURES 5 and 6 are a cutaway top view of the instrument and its housing showing the relative phases of the counting process.
Figure 6:
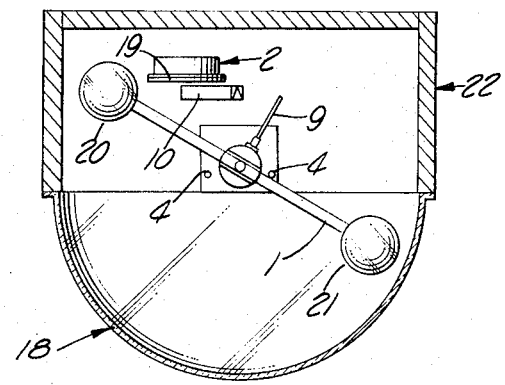
Figure 1:
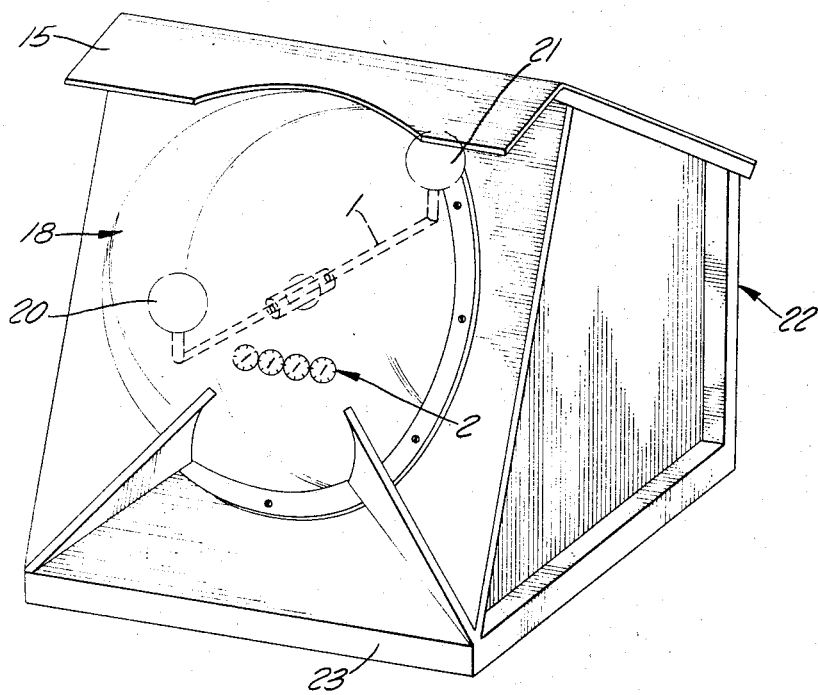
FIGURE 1 is an isometric view of the instrument.

FIGURE 1 shows the pulse glass with the bulbs positioned upwards and mounted at its midpoint about 20 degrees from its vertical. One of the bulbs is shielded from the sunlight by a housing 22 while the other is exposed to the sun's rays. A mechanical counter 2 counts the oscillations of the bulbs 20 and 21 as they change positions from the shielded to unshielded positions. A hood 15 protects the bulbs from the elements, rain, etc.

The following description is in reference to FIGURES 2 and 3. The spindle 12 is supported by two bearings located in spindle housing 13: the one near the top 11 is a ball bearing which takes up the lateral thrust of the spindle and the other 14, at the bottom of the spindle, is a pivot bearing of hardened material such as steel which takes the downward thrust. This pivot bearing 14 also keeps the spindle properly aligned. The spindle 12 and the pulse glass 23 are thus free to rotate with a minimum of friction.

Referring now to FIGURE 1, the housing 22 is so constructed that the lower bulb 20 will be exposed to the sun while the other bulb 21 is shaded. Under these conditions the exposed bulb becomes warmer. The resulting increase in vapor pressure in the lower bulb forces the liquid to move to the upper bulb, causing it to become the heavier. Because the spindle 12 is inclined and because of the difference in weight of the two bulbs, gravity now causes the upper bulb to swing to the lower position. This action is repeated so long as there is a temperature difference within the unit between the bulbs.

It is the frequency of the alternate rotary motion of the spindle and pulse glass which integrates the solar radiation received. To increase their efficiency in converting radiant energy to sensible heat, both bulbs are painted a flat black. To protect the pulse glass from wind and rain, a glass dome 18 is also provided.

Referring now back to FIGURES 2 and 3 which show the third component of the instrument, in the preferred embodiment of the invention, a mechanical counter 2 is utilized. This counter is the dial mechanism similar to that used in a watt hour meter.

The counter 2 is adapted to move the hand of the unit dial one division at every other swing of the pulse glass bulbs. This is accomplished by an arm 9 attached to the moving spindle 12 which strikes the counter actuating arm 10 which is attached to the counter mechanism 19. This mechanical counter is provided so as to allow the instrument to be utilized in remote areas, independent of any outside source of power.

Referring again to FIGURE 2 which shows the front view of the pulse glass 23, pulse glass support 24 and counter 2, the pulse glass 23 is shown in the position midway of an excursion at a point where counter 2 is to be actuated. This is accomplished by arm 9 striking and rotating the counter actuating arm 10 through a 30 degree arc. When the pulse glass 23 has completed its excursion in changing bulbs from sun to shade or vice versa, the magnet 3 is brought close to an adjustable steel screw 4. This has a slight holding effect on the pulse glass. Thus, the pulse glass will not start to swing again until this holding by the magnet is overcome by the weight of the alcohol entering the upper bulb. When this weight becomes sufficient the pulse glass breaks away and swings in a decisive manner. This magnet 3 thus prevents an equilibrium state from being reached whereby the glass bulbs 20 and 21 are both half in and half out of the sun or shade. The magnet 3 is mounted upon the spindle 12 in any suitable manner (FIG. 3) to oscillate therewith (FIG. 4).

While particular embodiments of this invention are shown and described, it will be obvious to those skilled in this art that changes and modifications might be made without departing from this invention in its broader aspects, and it is the aim, therefore, of the appended claim to cover all such changes and modifications as fall within the true scope and spirit of this invention.

I claim:

An instrument for measuring solar radiation comprising a pair of bulbs, a tube connecting said bulbs and containing a volatile liquid, means for pivotally mounting the tube on a moving spindle with the axis inclined to the vertical, a housing fixed relative to the mounting means for alternately shielding each bulb, a mechanical counter, said mechanical counter alternately activated by said pivotally mounted tube, an adjustable screw on said mounting means, and a position retaining means comprising a magnet carried on said moving spindle and adjacent to the adjustable screw to adjust the hold on the bulbs in a vertical plane until said volatile liquid has been sufficiently volatilized to overcome the position retaining means and thus cause said pivotally mounted tube to swing in a decisive manner.

References Cited

UNITED STATES PATENTS

| 1,911,426 | 5/1933 | Brodie | 73—339 |
| 1,911,456 | 5/1933 | Lyon | 73—355 |
| 2,998,722 | 9/1961 | Jaquith | 73—219 |

LOUIS R. PRINCE, *Primary Examiner.*

F. SHOON, *Assistant Examiner.*